(12) United States Patent
Voigt et al.

(10) Patent No.: US 6,454,229 B1
(45) Date of Patent: Sep. 24, 2002

(54) OFFSET CARDAN GIMBAL

(76) Inventors: Che Ram Souza Voigt, 505 Divisadero St. #B2, San Francisco, CA (US) 94117; Allan Alfred Voigt, 400 Breezewood Dr., Geyserville, CA (US) 95441; John Speicher, 133 Rossi, Geyserville, CA (US) 95441

( * ) Notice: Subject to any disclaimer, the term of this patent is extended or adjusted under 35 U.S.C. 154(b) by 0 days.

(21) Appl. No.: 09/837,247

(22) Filed: Apr. 18, 2001

Related U.S. Application Data

(60) Provisional application No. 60/198,521, filed on Apr. 19, 2000.

(51) Int. Cl.[7] .............................................. F16M 11/14
(52) U.S. Cl. .................................................... 248/182.1
(58) Field of Search ............................. 248/182.1, 179, 248/694, 181.1, 278.1

(56) References Cited

U.S. PATENT DOCUMENTS 4,063,462 A  * 12/1977  Himmler ..................... 73/483
4,276,122 A  *  6/1981  Snyder ....................... 202/234
5,897,223 A  *  4/1999  Tritchew et al. .............. 396/13
6,110,337 A  *  8/2000  Sullivan et al. ......... 204/298.26

* cited by examiner

*Primary Examiner*—Ramon O. Ramirez
(74) *Attorney, Agent, or Firm*—Risto A. Rinne, Jr.

(57) ABSTRACT

An apparatus for the control and alignment of a sensor on a moving vehicle is provided that includes a gimbal ball supported by an outer axis structure and adapted to pivot about an outer elevation axis and about an outer azimuth axis. The outer axis structure is mounted to a vehicle. A cardan assembly is provided in the ball that includes a cardan shaft with an inner elevation axis passing through the cardan shaft. The inner elevation axis is in parallel alignment with respect to the outer elevation axis and includes an offset that raises the inner elevation axis above the outer elevation axis by a predetermined amount to provide for a greater payload volume and improved optical performance. If desired the cardan assembly includes an inner azimuth axis that is offset with respect to the outer azimuth axis.

15 Claims, 3 Drawing Sheets

OFFSET CARDAN GIMBAL

BENEFIT OF PRIORITY

This utility patent application claims the priority of "Provisional Application" No. 60/198,521 filed on Apr. 19th, 2000, entitled "Modular Gimbal" by applicants John M. Speicher, Allan A. Voigt, and Che R. S. Voigt.

RELATED APPLICATION

This application is related to another utility patent application by the same applicants, being filed concurrently, entitled "Cardan Support".

BACKGROUND OF THE INVENTION

1. Field of the Invention

The present invention, in general relates to gimbals and, more particularly, to gimbals that provide accurate alignment of sensors and instrumentation that they support and which include a cardan that is offset.

Gimbals are commonly used to hold sensors stable when mounted on a moving vehicle, be it a land based vehicle, a sea (i.e., a water based) vehicle such as a boat or ship, or an air based vehicle such as an airplane.

The ability to hold a sensor stable while the vehicle moves is useful for a great variety of purposes. These purposes include obtaining information useful for navigation. Another purpose relates in general to an ability to align and then to hold the sensors where desired. Whatever information is being provided by the sensors is more reliable if the sensors themselves are held steady.

In general, gimbals have a plurality of outer axes and a plurality of inner axes. Coarse adjustments are commonly accomplished by movements made along the outer axes. Finer adjustments are commonly made with the inner axes.

There are a number of discreet functions a gimbal must achieve. It must both properly orient, maintain position, and support the size and weight of the sensors. This can vary from application to application.

The sensors are placed inside of a gimbal ball along with numerous other component parts that are used to orient the gimbal ball as required. In general, for any given size of the gimbal ball, the space (i.e., volume) that is available for the sensors is limited and a greater volume is desirable.

Another problem with prior art designs is supporting the weight of the sensors, also referred to as the "payload". It is desirable to increase the effective payload of a gimbal.

Gimbals include a cardan assembly that is disposed within a ball. The cardan assembly supports the weight of the payload that is carried by the gimbal as well as allowing small angular rotation in the positioning of the payload within the ball.

These changes in position are accomplished by rotating the payload (within the gimbal ball) about three axes (typical), namely elevation, roll, and azimuth. Coarser adjustments are accomplished by moving the gimbal ball itself typically in two axes, elevation and azimuth.

The cardan assembly includes a cardan shaft that traverses the inside diameter of the ball. The center of the cardan shaft is used, in certain designs, to define the internal elevation axis. Obviously, any type of a sensor that is contained within the ball cannot look through the cardan shaft.

Prior art designs place the cardan shaft so that it aligns with the external axis. In particular, the internal elevation axis is set to align with the external elevation axis. Prior art has taught away from the cardan shaft having any offset in this regard and instead certain of the prior art gimbal designs have labored to design gimbals where the internal and external axes are as nearly coincident as possible.

Any type of an offset between the internal and external elevation axes of the cardan assembly was believed to introduce instability into the design. An offset payload (i.e., mass) swinging inside the ball was also believed to severely limit the range of motion that is possible and was, accordingly, avoided in prior art gimbal design.

Increasing the size of the payload means more than merely increasing the weight carrying ability. The weight of the payload that is being suspended off of the cardan assembly is less of an issue now than it was in the past due, in part, to other innovations by the applicants, which are the subject of a related patent application being concurrently filed.

A current pressing problem of payload size relates to the simple fact that sensors cannot "see" through the cardan assembly. These sensors may be optical or other types of instruments. As is well known in the optical and other sensing arts, the size of the viewing lens largely determines its light gathering ability. In particular, a larger viewing area allows more light to enter. In the camera arts this is often referred to as the aperture. A larger aperture is desired. Often that part of an optical system that is the final interface to the outside is called an "objective" lens. A larger diameter objective lens means a smaller aperture number (in the camera arts) which means more light gathering ability.

Optical sensors of the type used in gimbals, like other optical types of instruments, are typically either reflective or refractive (or a combination of both). Reflective devices rely upon mirrors to direct and focus the collected image whereas refractive devices rely upon lenses to direct and focus the image.

In either case, an "optical path" is required and this optical path requires distance to accomplish. This distance must be accomplished entirely within the ball. The cardan assembly interferes with not only the size of the aperture by limiting its maximum size, but it also limits the space that is available for the optical path.

The efficacy of any type of a sensor depends upon providing both a maximum aperture size (for any given ball diameter size) as well as a maximum amount of clear, open space for the design of the optical path.

Offsetting the cardan assembly (with respect to the elevation axis) allows for a larger aperture and it provides more space (i.e., volume) within the ball for the optical path. It also allows for physically larger payloads to be carried.

It is also possible to offset the cardan assembly (that portion that controls the roll and azimuth axes) off to the side. This, while also contrary to prior gimbal design, provides for an even larger open area for maximizing both aperture size and for optical path considerations for any given ball diameter size. In those instances where such an offset is provided, counterweights are employed to balance the payload while other limits are provided to ensure that the payload does not swing excessively and "bump" into the ball.

It is important to understand that the internal axes provide finer corrections than do the external axes and accordingly, a smaller range of motion is therefore acceptable for the payload in the gimbal ball. Larger corrections are made by moving the entire gimbal ball relative to the vehicle upon which the gimbal itself is mounted.

Therefore, it is desirable to be able to increase the aperture size of a sensor for any given size of a gimbal ball. Certain physical parameters inherent in a gimbal (such as the need to maintain close alignment between and outer elevation axis and an inner elevation axis) have, in the past, served to limit the maximum size for the aperture possible. Ideally, for any given size of a gimbal as large an aperture as can be had is preferred as is providing the maximum area possible for the design of the optical path.

It is also noted that other types of sensors which may employ direct viewing of the subject may be supported by the cardan assembly as the payload. These direct viewing types of sensors include any and all known modalities of data collection (and are adapted for use with emergent technologies). Examples of different modalities that may incorporated direct viewing types of sensors include infrared, ultraviolet, and radio-frequency. Direct viewing types of sensor also benefit from a larger viewing area (i.e., aperture size) as well as from providing a maximum area to accommodate their physical size.

It is also important to note that the cardan assembly may be used to support multiple types of sensors simultaneously. For example, a zoom television camera can be used for general spotting purposes and to locate an object of interest as well as for general pointing (i.e., aiming) of the gimbal. Upon locating the object of interest, a larger focal length camera can be used to more carefully study it. Accordingly, both types of cameras can be simultaneously mounted as part of the payload that is supported by the cardan assembly.

The payload may also be active instead of passive. A passive payload merely observes the object of interest whereas an active payload is adapted to affect it. The payload may be used to support an active component that can, for example, illuminate the object. For example, a gimbal can contain a source of illumination, such as a spotlight or a laser, and be mounted on, for example, a helicopter. Accordingly, as the helicopter hovers and fluctuates in its position relative to the object, the gimbal can be used to compensate for any movement by the helicopter in order to hold the source of illumination constantly upon the object.

If the source of illumination is a spotlight, then a larger physical payload capacity as well as a larger optical path as well as a larger aperture size all allow for a larger and brighter spotlight to be used. The same benefits apply if any other type of an active payload is utilized.

Accordingly, there exists today a need for an offset cardan gimbal that affords. relief regarding any of the aforementioned prior art limitations.

Clearly, such an apparatus would be useful and desirable.

2. Description of Prior Art

Gimbals are, in general, known. While the structural arrangements of the known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an offset cardan gimbal that provides an improved ability to maintain (i.e., hold) sensors in proper alignment with their intended object of interest.

Still yet another object of the invention is to provide an offset cardan gimbal that provides a greater payload capacity.

Yet another important object of the invention is to provide an offset cardan gimbal that provides improved optical performance for any given size of a gimbal ball.

It is a first continuing object of the present invention to provide an offset gimbal that increases the aperture size of a sensor that is supported by the gimbal.

It is a second continuing object of the present invention to provide an offset gimbal that includes an offset between the outer elevation axis and the inner elevation axis that is useful in increasing aperture size.

It is a third continuing object of the present invention to provide an offset gimbal that includes an offset between the outer elevation axis and the inner elevation axis that is useful in increasing useful payload volume.

It is a fourth continuing object of the present invention to provide an offset gimbal that increases the usable space inside of a gimbal ball.

It is a fifth continuing object of the present invention to provide an offset gimbal that increases the usable space inside of a gimbal ball sufficient to allow for a plurality of sensors to be used.

It is a sixth continuing object of the present invention to provide an offset gimbal that is adapted for use with either passive or active types of payloads.

Briefly, an offset gimbal. that is constructed in accordance with the principles of the present invention has an outer axis support structure that supports a gimbal ball. The outer axis support structure is attached to an object that includes any type of a vehicle or moving structure. The gimbal ball is adapted to rotate with respect to the vehicle about an outer elevation axis and about an outer azimuth axis. A cardan assembly is provided in the ball that includes a cardan shaft. A center longitudinal axis passing through the cardan shaft is used to define an inner elevation axis and it is disposed in parallel longitudinal alignment with respect to the outer elevation axis and is offset with respect thereto. The cardan assembly supports a payload. The offset provides for an increased volume for the payload. If desired, the cardan assembly may include an inner azimuth axis, about which the payload is adapted to rotate, that also includes an offset with respect to the outer azimuth axis.

DETAILED DESCRIPTION OF THE INVENTION

Figure 1:
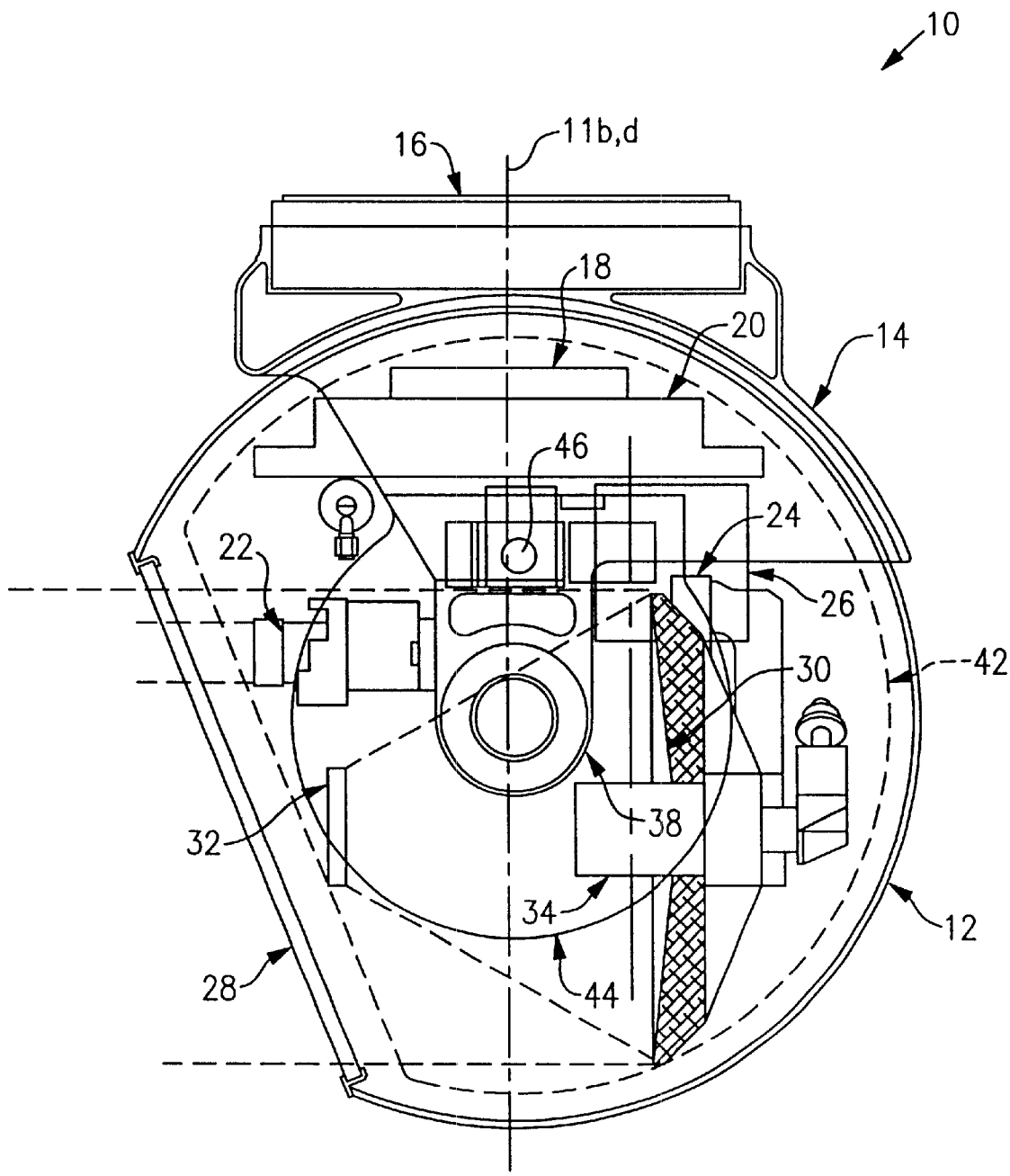
FIG. 1 is cross-sectional side view of an offset cardan gimbal.

Referring on occasion to all of the FIGURE drawings and in particular now to FIG. 1 is shown an offset cardan gimbal, identified in general by the reference numeral 10.

The gimbal 10 is a five-axis type of a gimbal, although the improvements, as described, apply to any type of a gimbal having any number of axes of movement. The gimbal 10 includes two external axes, an external or outer elevation axis 11a and an external or outer azimuth axis 11b, such as are well known to those possessing ordinary skill in the art. It similarly includes an internal or inner elevation axis 11c, and an internal or inner azimuth axis lid, and an internal or inner roll axis 11e.

Changes about these axes that are made by the gimbal 10 compensate for movement by the vehicle (not shown) to which the gimbal 10 is mounted. The gimbal 10 is typically attached to a vehicle of some type including, for example, any land, sea, or air type of a vehicle.

The gimbal 10 maintains alignment of a sensor (or sensors) that it carries with an object of interest while the vehicle moves. This is accomplished by proportionately controlling the various axes so as to move the sensors in response to detected movement that is experienced by the vehicle.

Normally, Coarser adjustments in elevation and azimuth are accomplished by the outer elevation axis 11a and the outer azimuth axis 11b. Finer adjustments in elevation and azimuth are accomplished by the inner elevation axis 11c and the inner azimuth axis 11d. Changes in roll are accomplished by the inner roll axis 11e.

Motors (not shown) receive control signals in response to changes that occur along these axes of movement. For example, one or a plurality of gyroscopes (not shown) may be used to detect such motion. Output from the gyroscope(s) can be processed (by a computer or other circuitry) which can then be used to immediately supply appropriate feedback to the various motors that control position along these axes, thereby compensating for movement and keeping the sensors that are supported by the gimbal 10 aligned with whatever object it is observing.

The gimbal 10 may be of any desired size. It includes a gimbal ball 12. The ball 12 is supported by an outer axis support structure 14 (see FIGS. 1 and 2). The outer axis structure 14 is sometimes referred to as a "yoke".

The gimbal 10 includes an outer azimuth drive module 16 that moves the entire ball 12 (and the outer axis support structure 14) with respect to the vehicle about the outer azimuth axis 11b. For FIGS. 1–6, the outer azimuth axis 11b is in substantial alignment with respect to the inner azimuth axis 11d. Coarse adjustments in azimuth are accomplished by moving the ball 12 along the outer azimuth axis 11b. Coarse adjustments is elevation are accomplished by moving the ball along the outer elevation axis 11a.

As desired, a cooling and heating assembly 18 is used to maintain a proper temperature in the ball 12. An electronics package 20 that includes all necessary circuitry is included in the ball 12, as well.

A zoom type of a television camera 22 is often included to aid in sighting and aligning the gimbal 10 with the object of interest.

After spotting the object of interest with the zoom camera 22, a main camera 24 (or sensor) is used to further examine the object of interest. The main camera 24 may have greater light gathering ability or a longer focal length than the zoom camera 22. It may also rely upon other sensing technologies, as are discussed in greater detail hereinafter. The zoom camera 22 may be used for finding the objects of interest with the task of actual data collection being deferred to the main camera 24.

The main camera 24, as mentioned, may include other types of sensors including infrared, ultraviolet, radio frequency, or any other type of a sensor, as may be desired.

The zoom camera 22 along with the main camera 24 also shows how the offset cardan gimbal 10 may be used to support a plurality of sensors. Obviously, any number of sensors may be included in the ball 12 as are desired and practical. The zoom camera 22 and the main camera 24, as shown, form the payload of the gimbal 10. Support for the payload (i.e., the zoom camera 22, the main camera 24, or other sensors) is described in greater detail hereinafter.

A gyroscope package 26 is typically included in the ball 12 that includes a plurality of gyroscopes that are used to provide a reference signal. The reference signal is supplied to the electronics package 20 and is used to indicate a change in attitude (i.e., movement) by the vehicle.

As mentioned hereinabove, any type of a vehicle to which the gimbal 10 is attached may be used. It may be a land vehicle, and aircraft, or a sea or watercraft. The versatility and potential uses for the offset cardan gimbal 10 are virtually limitless.

If the vehicle is an aircraft, for example an airplane (not shown) to which the gimbal 10 is attached, the vehicle (i.e., the aircraft) becomes a reference. If the main camera 24 is pointed at an object of interest and the airplane moves about any axis (either in pitch [i.e., elevation], roll, or yaw [i.e., azimuth]) the gimbal 10 detects this motion by the aircraft (the gyroscope package 26 detects it) and the electronics package 20 instantaneously supplies a corrective electronic signal to any of a plurality of motors (not shown) in order to move the ball 12 of the gimbal 10 or the payload within the ball 12 or both so as to ensure that the main camera 24 remains pointed at the object of interest.

The motors that move the payload with respect to the ball 12 are used for finer types of corrections. These motors control movement about the inner elevation, azimuth, and roll axes 11c, 11d, and 11e respectively, and are mounted inside the ball 12, where desired. They move the payload that is inside of the ball 12 around these axes a small amount to correct for subtle changes in movement by the vehicle. The motors used are of a type that is appropriate for the application at hand. Those skilled in the art are able to select appropriate types and sizes of (electrical) motors to effect movement about the three inner axes 11c–e.

A window 28 provides viewing access (i.e., an interface) for the main camera 24 (or sensors) with the outside world. The window 28 can be considered an objective lens. The larger the window 28, the greater the light gathering ability for the main camera 24 (or sensors).

Although refractive types of optics may well be used with the offset cardan gimbal 10, a reflective type of an optical system is shown as one example (of a payload) and it includes a primary mirror 30 and a secondary mirror 32 as well as an optical mechanism 34 that is used to direct, adjust the focus, and also to control the field of view of the image that is supplied to the main camera 24.

An outer elevation drive module 36 includes bearings that support one end of the ball 12 and a motor for moving the ball 12 about the outer elevation axis 11a. Coarser adjustments in elevation, as were discussed hereinabove, are made by moving the ball 12 in a circle about the outer elevation axis 11a. The ball 12 moves in elevation with respect (i.e., relative) to the outer axis support structure 14.

An outer elevation bearing module 38 includes bearings that support the opposite end of the ball 12. The outer elevation axis 11a passes through the center of the bearings of both the outer elevation drive module 36 (on one end of the ball 12) and the outer elevation bearing module 38 (on the opposite end of the ball 12).

Figure 2:
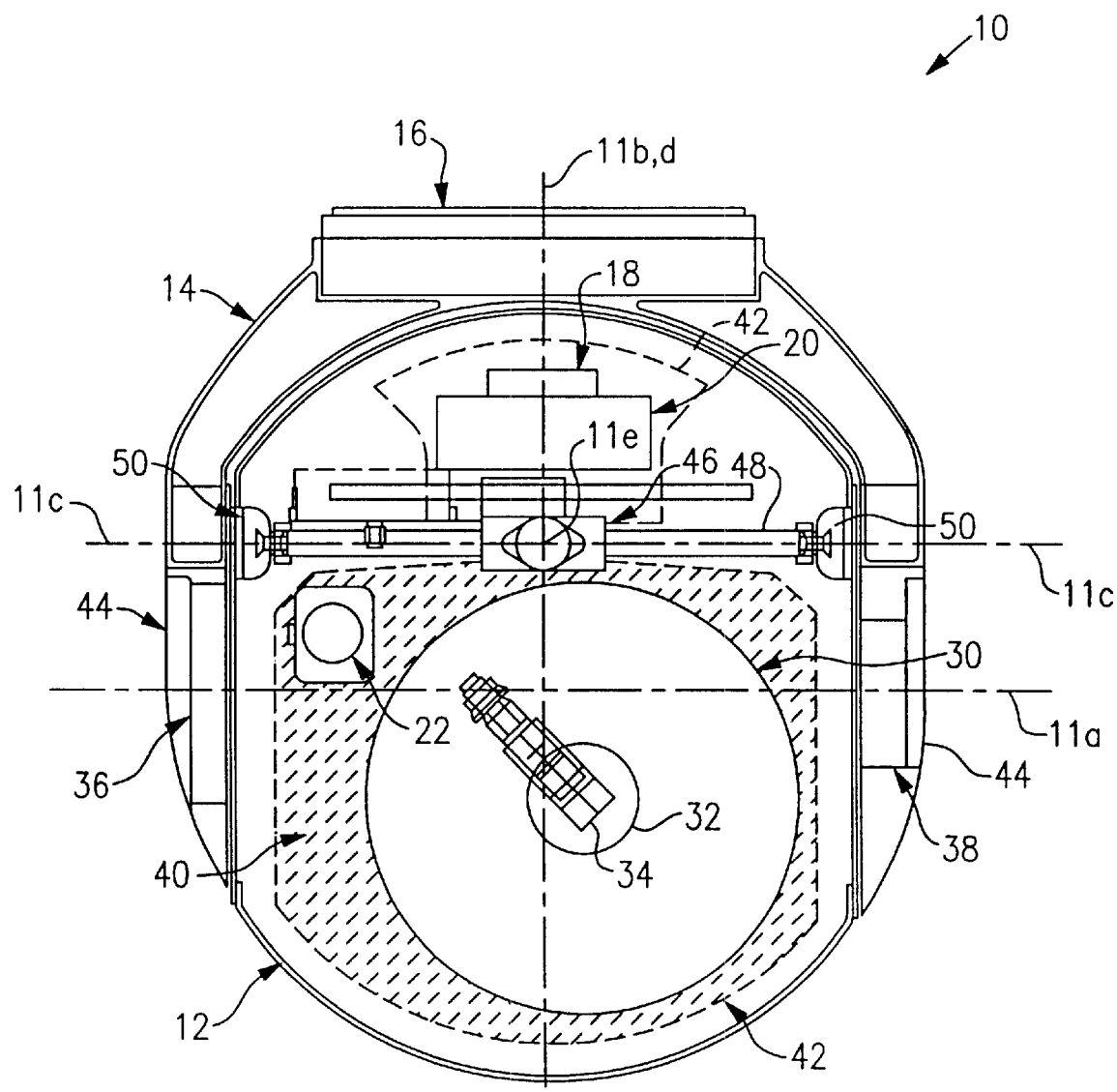
FIG. 2 is a cross-sectional front view of the offset cardan gimbal of FIG. 1.

Referring to FIG. 2, a crosshatch pattern 40 shows a cross-section of the available volume for additional or larger payloads, as desired.

A vibration clearance 42 is provided around the payload to prevent any part of the payload from contacting the inside of the ball 12.

A pair of streamlining covers 44 are attached to the outer axis structure 14 and smooth both appearance and air flow around the gimbal 10.

A three axis cardan assembly 46 is supported on each end of a cardan shaft 48 by a pair of vibration isolators 50. The three axes of motion that are provided by the cardan assembly 46 include movement around the inner elevation axis 11c, the inner azimuth axis 11d, and the inner roll axis 11e. The payload is moved within the ball 12 along these axes 11c–e.

Figure 7:
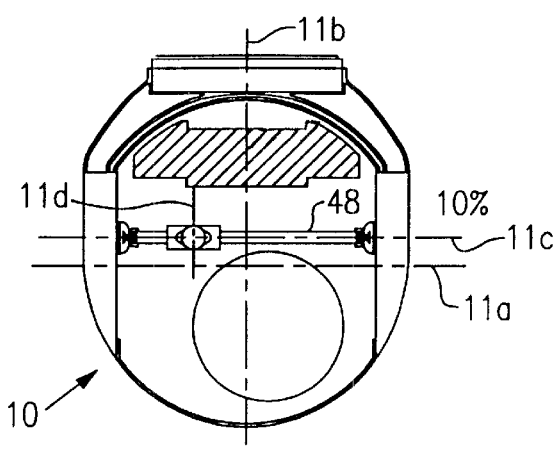
FIG. 7 is a simplified front view, similar to that of FIG. 2, showing a cardan assembly that includes a 10% (of the ball diameter) offset of the inner elevation axis from the outer elevation axis and which also includes an offset with respect to the inner and outer azimuth axes.

The inner elevation axis 11c passes through the center of the cardan shaft 48. The inner azimuth axis 11d is usually coincident with the outer azimuth axis 11b. (See FIG. 7 for an example of an offset between the inner azimuth axis 11d and the outer azimuth axis 11b.) The inner roll axis 11e extends in and out of the drawing of FIG. 2.

The inner elevation axis 11c (i.e., the cardan shaft 48) is in parallel alignment with respect to the outer elevation axis 11a and is offset therefore a predetermined distance. The offset is accomplished by raising the cardan assembly 46 above the outer elevation axis 11a.

This offset provides the necessary clearance to allow for the window 28 to be larger than it could be were the inner elevation axis 11c coincident with the outer elevation axis 11a. By offsetting the cardan assembly 46, a larger payload, including a larger type of the primary mirror 30, is possible.

The amount of offset shown is a function of the distance between the inner elevation axis 11c and the outer elevation axis 11a and it is expressed as a percentage of the diameter of the ball 12.

Figure 3:
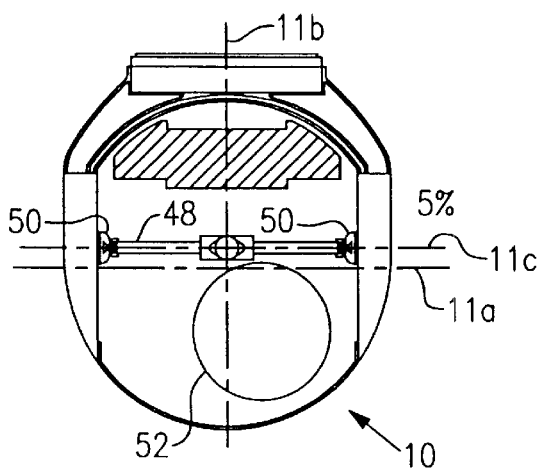
FIG. 3 is a simplified front view, similar to that of FIG. 2, showing a cardan assembly that includes a 5% (of the ball diameter) offset of the inner elevation axis from the outer elevation axis.

Referring now to FIG. 3, an offset of 5% (of the ball 12 diameter) between the inner elevation axis 11c and the outer elevation axis 11a is shown. This amount of offset provides a space that allows for a first primary mirror 52 having a particular maximum size. The maximum possible size of the first primary mirror 52 is greater than it would be if there were no offset because, all other factors held constant, the cardan shaft 48 would obstruct the field of view of the first primary mirror 52 if there were no offset provided.

Figure 4:
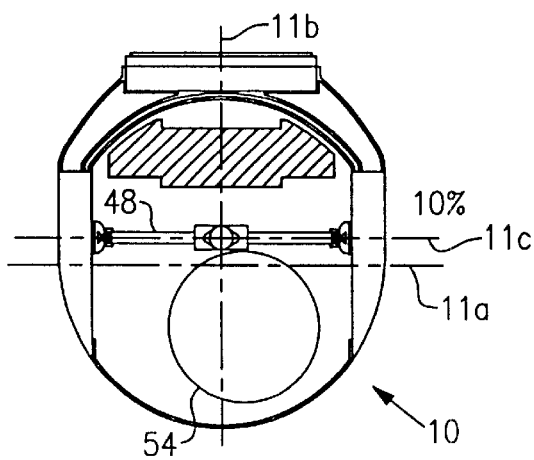
FIG. 4 is a simplified front view, similar to that of FIG. 2, showing a cardan assembly that includes a 10% (of the ball diameter) offset of the inner elevation axis from the outer elevation axis.

Referring now to FIG. 4, an offset of 10% between the inner elevation axis 11c and the outer elevation axis 11a is shown. This amount of offset provides a space that allows for a second primary mirror 54 having a particular maximum size. The maximum possible size of the second primary mirror 54 is greater than it would be if there were no offset because, all other factors held constant, the cardan shaft 48 would obstruct the second primary mirror 54 if there were a lesser amount of offset. Furthermore, the maximum size of the second primary mirror 54 is greater than that possible for the first primary mirror 52 due to the greater offset.

Figure 6:
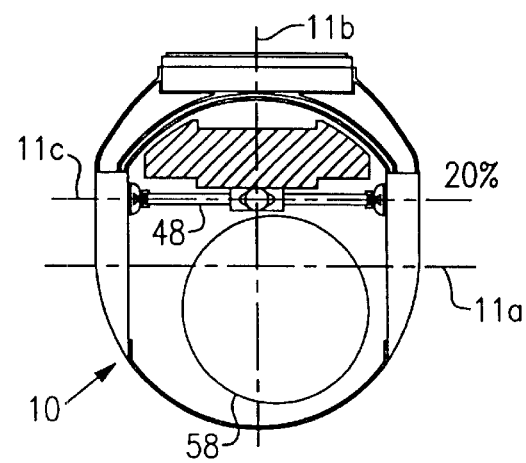
FIG. 6 is a simplified front view, similar to that of FIG. 2, showing a cardan assembly that includes a 20% (of the ball diameter) offset of the inner elevation axis from the outer elevation axis.
Figure 5:
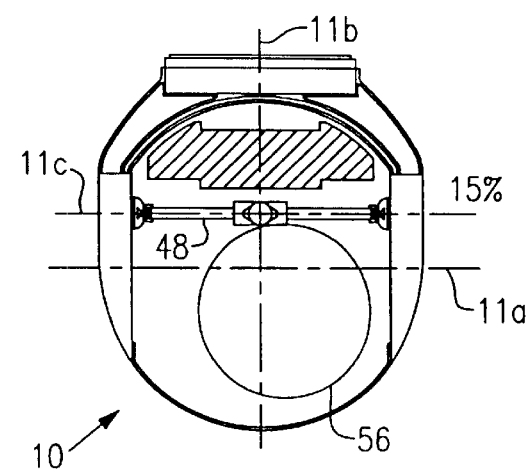
FIG. 5 is a simplified front view, similar to that of FIG. 2, showing a cardan assembly that includes a 15% (of the ball diameter) offset of the inner elevation axis from the outer elevation axis.

Similarly, referring now to FIG. 5, an offset of 15% provides even more room for a third primary mirror 56. The third primary mirror 56 is even larger than the second primary mirror 54. Referring now to FIG. 6, an offset of 20% provides even more room for a fourth primary mirror 58 that is larger still.

Referring now to FIG. 6, a 10% offset is again provided intermediate the inner elevation axis 11c and the outer elevation axis 11a. The inner azimuth axis 11d of the cardan assembly 46 is offset with respect to the outer azimuth axis 11b by displacing it to the side along the cardan shaft 48. This provides even more room for a fifth primary mirror 60 that can be even larger than the second primary mirror 54. Similarly, the roll axis 11e may be offset as well to provide even more room.

While the above examples include changes that affect the size of the primary mirror a similar change in the size of the window 28 or of the payload in general is also achieved by various changes in the amount of offset of the inner elevation axis 11c with respect to the outer elevation axis 11a and in the amount of offset of the inner azimuth axis 11d with respect to the outer azimuth axis 11b.

Accordingly, a method of increasing the size (i.e., the volume) of the payload is provided by introducing offsets to either or both the inner elevation axis 11c with respect to the outer elevation axis 11a or the inner azimuth axis 11d with respect to the outer azimuth axis 11b, or both.

The invention has been shown, described, and illustrated with reference to the presently preferred embodiments thereof. It will be understood by those skilled in this art that other and further changes and modifications may be made without departing from the spirit and scope of the invention which is define by the claims appended hereto.

What is claimed is:

1. An offset cardan gimbal, comprising:
   (a) a gimbal ball;
   (b) an outer axis structure adapted to support said gimbal ball and including means for providing for the motion of said ball about an external elevation axis and about an external azimuth axis; and
   (c) a cardan assembly disposed in said ball, said cardan assembly including a cardan shaft, said cardan shaft adapted to pivot about an inner elevation axis, said inner elevation axis disposed in substantially parallel longitudinal alignment with respect to said external elevation axis and including an offset with respect to said external elevation axis.

2. The offset cardan gimbal of claim 1 wherein said offset includes a magnitude that is at least five percent of the diameter of said ball.

3. The offset cardan gimbal of claim 1 wherein said offset includes a magnitude that is at least ten percent of the diameter of said ball.

4. The offset cardan gimbal of claim 1 wherein said offset includes a magnitude that is at least fifteen percent of the diameter of said ball.

5. The offset cardan gimbal of claim 1 wherein said offset includes a magnitude that is at least twenty percent of the diameter of said ball.

6. The offset cardan gimbal of claim 1 wherein said cardan assembly is adapted to support a payload.

7. The offset cardan gimbal of claim 6 wherein said cardan assembly includes an inner azimuth axis said inner azimuth axis being disposed in perpendicular longitudinal alignment with respect to said inner elevation axis and wherein said payload is adapted to pivot about said inner azimuth axis, said inner azimuth axis disposed in parallel longitudinal alignment with respect to said external azimuth axis and including an offset with respect to said external azimuth axis.

8. The offset cardan gimbal of claim 6 wherein said cardan assembly includes an inner roll axis that includes an offset with respect to a normal axis.

9. A method for increasing the payload size of a gimbal which comprises:

(a) providing a gimbal ball;

(b) providing an outer axis structure-adapted to support said gimbal ball and including means for providing for the motion of said ball about an external elevation axis and about an external azimuth axis; and (c) providing a cardan assembly disposed in said ball, wherein said cardan assembly including a cardan shaft, and wherein said cardan shaft is adapted to pivot about an inner elevation axis, and wherein said inner elevation axis is disposed in parallel longitudinal alignment with respect to said external elevation axis and wherein said inner elevation axis includes an offset with respect to said external elevation axis.

10. The method of claim 9 wherein the step of providing a cardan assembly includes the step of providing an offset for said inner elevation axis of said cardan assembly with respect to said outer elevation axis of the gimbal support structure that is at least five percent of the magnitude of the diameter of said gimbal ball.

11. The method of claim 9 wherein the step of providing a cardan assembly includes the step of providing an offset for said inner elevation axis of said cardan assembly with respect to said outer elevation axis of the gimbal support structure that is at least ten percent of the magnitude of the diameter of said gimbal ball.

12. The method of claim 9 wherein the step of providing a cardan assembly includes the step of providing an offset for said inner elevation axis of said cardan assembly with respect to said outer elevation axis of the gimbal support structure that is at least fifteen percent of the magnitude of the diameter of said gimbal ball.

13. The method of claim 9 wherein the step of providing a cardan assembly includes the step of providing an offset for said inner elevation axis of said cardan assembly with respect to said outer elevation axis of the gimbal support structure that is at least twenty percent of the magnitude of the diameter of said gimbal ball.

14. The method of claim 9 including the additional step of providing an offset for an inner azimuth axis of the cardan assembly with respect to said outer azimuth axis.

15. The method of claim 9 including the additional step of providing an offset for an inner roll axis of the cardan assembly.

\* \* \* \* \*